United States Patent [19]

Schroeter et al.

[11] 4,298,632
[45] Nov. 3, 1981

[54] SILICONE COATED ABRASION RESISTANT POLYCARBONATE ARTICLE

[75] Inventors: Siegfried H. Schroeter, Schenectady; Daniel R. Olson, Clifton Park, both of N.Y.

[73] Assignee: General Electric Company, Pittsfield, Mass.

[21] Appl. No.: 67,470

[22] Filed: Aug. 17, 1979

Related U.S. Application Data

[62] Division of Ser. No. 956,809, Nov. 1, 1978, Pat. No. 4,243,720.

[51] Int. Cl.$^3$ .......................... B05D 1/38; B05D 5/00
[52] U.S. Cl. .................................. 427/160; 427/164; 427/387; 427/407.1; 428/412; 428/447; 428/451; 428/500; 428/520; 428/522
[58] Field of Search .............. 428/412, 447, 448, 451, 428/500, 520, 522; 427/385 B, 387, 407.1, 160, 164

[56] References Cited

U.S. PATENT DOCUMENTS

| | | | |
|---|---|---|---|
| 2,976,184 | 3/1961 | Blatz | 427/385 |
| 3,379,607 | 4/1968 | Foster et al. | 428/500 |
| 3,451,838 | 6/1969 | Burzynski et al. | 427/385 |
| 3,488,215 | 1/1970 | Shepherd et al. | 427/385 |
| 3,582,398 | 6/1971 | Ringler | 428/412 |
| 3,953,115 | 4/1976 | French et al. | 428/450 |
| 3,968,305 | 7/1976 | Oshima et al. | 428/412 |
| 3,968,309 | 7/1979 | Matsuo et al. | 428/522 |
| 3,978,178 | 8/1976 | Oshima et al. | 264/25 |
| 3,986,997 | 10/1976 | Clark | 260/29.2 M |
| 4,026,826 | 5/1977 | Yoshida et al. | 260/25 |
| 4,027,073 | 5/1977 | Clark | 428/412 |
| 4,028,300 | 6/1977 | Wake et al. | 428/450 |
| 4,041,120 | 8/1977 | Oshima et al. | 428/412 |
| 4,045,602 | 8/1977 | Sommer et al. | 427/386 |
| 4,064,286 | 12/1977 | Hahn | 427/386 |
| 4,103,065 | 7/1978 | Gagnon | 428/412 X |
| 4,159,206 | 6/1979 | Armbruster et al. | 428/447 |
| 4,210,699 | 7/1980 | Schroeter et al. | 428/331 |

*Primary Examiner*—Shrive P. Beck
*Attorney, Agent, or Firm*—William F. Mufatti

[57] ABSTRACT

A non-opaque coated polycarbonate shaped article, and a process for producing the same, having improved abrasion and chemical solvent resistance comprising a polycarbonate substrate having thereon (i) a primer layer comprised of a thermoplastic acrylic polymer containing functional groups; and (ii) a top coat containing a thermoset organopolysiloxane on said primer layer.

The process for producing said coated polycarbonate article comprises the steps of: (i) priming the surface of a polycarbonate substrate by forming a primer layer comprised of a thermoplastic acrylic polymer containing functional groups; (ii) applying a top coat composition containing a further curable organopolysiloxane onto the primed substrate; and (iii) curing the further curable organopolysiloxane to form a hard, abrasion and chemical solvent resistant top coat which is tenaciously and durably adhered to the polycarbonate substrate.

6 Claims, No Drawings

SILICONE COATED ABRASION RESISTANT POLYCARBONATE ARTICLE

This is a division of application Ser. No. 956,809, filed Nov. 1, 1978 now U.S. Pat. No. 4,243,720.

This invention relates to non-opaque abrasion and chemical solvent resistant organopolysiloxane coated shaped polycarbonate articles wherein the organopolysiloxane top coat is uniformly and tenaciously adhered to the polycarbonate substrate, and to a process for producing such an article. More particularly, the present invention relates to an organopolysiloxane coated polycarbonate article having a primer layer disposed between the polycarbonate substrate and the organopolysiloxane top coat comprising a thermoplastic acrylic polymer containing functional groups. The process for producing said article comprises priming the polycarbonate substrate with an adhesion promoting thermoplastic acrylic polymer containing functional groups by forming a film of said acrylic polymer on the surface of the polycarbonate article; applying onto the primed surface a further-curable organopolysiloxane top coat composition; and curing the further-curable organopolysiloxane to form a uniform and tenaciously adherent abrasion and chemical resistant top coat.

BACKGROUND OF THE INVENTION

The use of transparent glazing materials utilizing polycarbonate resin as a structural component for windows, windshields and the like are well known. While these polycarbonate resins are easily fabricated into the desired shape and have excellent physical and chemical properties, such as being less dense than glass and having more breakage resistance than glass, their abrasion and chemical solvent resistant is relatively low.

In order to overcome this relatively low abrasion resistance and to otherwise improve the surface characteristics of the polycarbonate substrate, various coatings have been applied to the polycarbonate resins. U.S. Pat. No. 3,582,398 describes a fabricated polycarbonate part having improved optical properties consisting of a polycarbonate substrate having a transparent coating thereon consisting of a thermoplastic polymethylmethacrylate. U.S. Pat. No. 4,061,652 describes a coating for polycarbonate resins comprised of (i) an acrylic resin which is a mixture of olefinically unsaturated organic monomers in combination with an acrylic polymer, and (ii) certain urethanes of hydroxybenzotriazoles and hydroxybenzophenones in combination with certain catalysts. U.S. Pat. Nos. 3,451,838, 3,986,997 and 4,027,073 disclose organopolysiloxane coating compositions and techniques for the application of these organopolysiloxane coatings onto polycarbonate surfaces. While these coatings have many desirable properties, e.g., they are hard, abrasion resistant, and chemical solvent resistant, these organopolysiloxane coatings do not in all instances possess the requisite degree of uniform adherence to and durability on these polycarbonate surfaces. U.S. Pat. No. 3,707,397 describes a process for providing a hard coating on, inter alia, polycarbonate articles, said process including priming the polycarbonate surface with an adhesion promoting thermosettable acrylic and applying an organopolysiloxane onto the primed surface. An article produced by this process, while possessing acceptable initial adherence of the organopolysiloxane to the substrate, suffers from the disadvantage that upon prolonged exposure to weathering, and particularly to sunlight, the organopolysiloxane generally tends to lose its initial adherence to the substrate. Furthermore, as the thickness of the thermoset acrylic primer layer increases, the abrasion resistance of the coated article generally decreases. There thus remains a need for non-opaque polycarbonate articles having uniformly, tenaciously and durably adhered abrasion and chemical resistant coatings thereon, and it is a primary object of the present invention to provide such articles and a relatively simple and economical process for producing these articles.

DESCRIPTION OF THE INVENTION

This invention relates to non-opaque organopolysiloxane coated polycarbonate articles having a thermoplastic functional group containing acrylic polymer, adhesion promoting primer layer disposed between the polycarbonate surface and the organopolysiloxane, and to a process for producing these articles.

In the practice of the present invention, prior to the application of the organopolysiloxane coating to the polycarbonate surface, the surface is first primed by the application thereon of a primer layer containing a thermoplastic acrylic polymer having functional groups.

The aromatic carbonate polymer of the instant invention has recurring units of the formula:

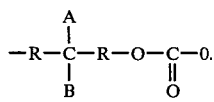   I wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

The aromatic carbonate polymer of this invention may be prepared by methods well known in the art and as described in U.S. Pat. No. 3,989,672 all of which are incorporated by reference.

Also, included herein are branched polycarbonates wherein a polyfunctional aromatic compound is reacted with the dihydric phenol and carbonate precursor to provide a thermoplastic randomly branched polycarbonate wherein the recurring units of formula I. contain branching groups.

The preferred polycarbonate resins may be derived from the reaction of bisphenol-A and phosgene. These polycarbonates have from 10–400 recurring units of the formula:

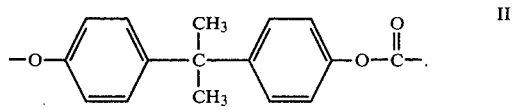   II

The polycarbonate should have an intrinsic viscosity between 0.3 and 1.0, preferably from 0.40 to 0.65 as measured at 25° C. in methylene chloride.

The term "thermoplastic acrylic polymer having functional groups" as used herein is meant to embrace within its scope those thermoplastic polymers resulting from the polymerization of at least one substituted acrylic or methacrylic ester monomer represented by the general formula $$CH_2=CY-COOR^1X \qquad III.$$

wherein Y is hydrogen or a methyl radical; $R^1$ is an alkyl group, preferably an alkyl group containing from 1 to about 20 carbon atoms; and X is a hydroxyl, carboxyl, amine, epoxide, amide, SH, $SO_3H$. $COOR^2$ and $Si(OR^3)_3$ group, wherein $R^2$ and $R^3$ are alkyl groups, preferably alkyl groups containing from 1 to about 20 carbon atoms. Copolymers resulting from the polymerization of two or more of substituted acrylic ester and substituted methacrylic ester monomers are also included within the term thermoplastic acrylic polymer having functional groups as it appears herein. Also included within the term thermoplastic acrylic polymers containing functional groups as used herein are copolymers resulting from the copolymerization of acrylic acid esters, i.e., acrylate, monomers and/or methacrylic acid esters, i.e., methacrylate, monomers with the aforedescribed substituted acrylic ester or substituted methacrylic ester monomers. Exemplary acrylate and methacrylate monomers which can be copolymerized with the substituted acrylic ester and/or substituted methacrylic ester monomers to form the thermoplastic acrylic polymers containing functional groups include methyl acrylate, ethyl acrylate, butyl acrylate, 2-ethylhexylacrylate, methyl methacrylate, ethyl methacrylate, butyl methacrylate, hexyl methacrylate, etc. Examples of copolymers of this type include copolymers containing ethyl methacrylate and hydroxyethyl methacrylate, ethyl methacrylate and γ-methacryloxypropyltrimethoxysilane, methyl acrylate and hydroxyethyl acrylate, and the like. The polymerization of the above monomeric substituted acrylates and methacrylates to provide the thermoplastic acrylic polymer having functional groups useful in the practice of the present invention may be accomplished by any of the well known polymerization techniques.

Typical substituted acrylic and methacrylic acid ester monomers represented by the formula III are set forth in Table I.

TABLE I $CH_2=C(CH_3)COOCH_2CH_2OH$
$CH_2=CHCOOCH_2OH$
$CH_2=CHCOOCH_2CHOCH_3$
$CH_2=CHCOOCH_2CHNH_2CH_3$
$CH_2=CCH_3COOCH_2CH_2CH_2NH_2$
$CH_2=CHCOOCH_2CH_2NH_2$
$CH_2=CHCOOCH_2CH_2Si(OCH_3)_3$
$CH_2=CCH_3COOCH_2CH_2CH_2Si(OCH_3)_3$
$CH_2=CHCOOCH_2CH_2COOH$
$CH_2=CCH_3COOCH_2CH_2CH_2CH_2COOH$
$CH_2=CCH_3COO(CH_2)_6SH$ $CH_2=CH\ COO\ CH_2CH-CH_3$
            |
            $CH_2-SO_3H$ $CH_2=CH\ COO\ CH_2CH_2CH_2CONH_2$ $CH_2=CCH_3COOCH_2CHCH_3$
            |
            $COOCH_2$ $CH_2=CCH_3COOCH_2CH_2CH_2COOCH_2CH_3$

TABLE I-continued

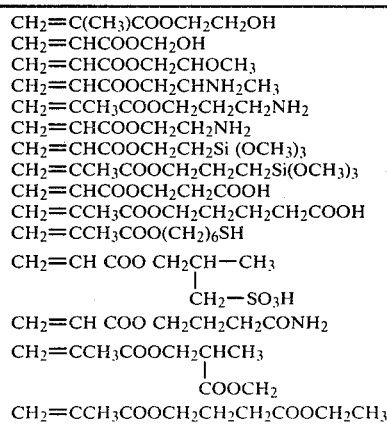

The term thermoplastic acrylic polymers containing functional groups as used herein thus includes homopolymers obtained from the polymerization of substituted acrylic ester monomers and substituted methacrylic ester monomers, copolymers obtained from the polymerization of two or more substituted acrylic ester monomers, copolymers obtained from the polymerization of two or more substituted methacrylic ester monomers, copolymers obtained from the polymerization of at least one substituted acrylic ester monomer with at least one substituted methacrylic ester monomer, and copolymers obtained from the polymerization of at least one substituted methacrylic ester and/or substituted acrylic ester monomer with at least one acrylic ester and/or methacrylic ester monomer.

Mixtures of two or more of the aforedescribed homopolymers or copolymers can also be used in the practice of the present invention.

For acceptable results, the thermoplastic acrylic polymers containing functional groups should have a molecular weight of at least 20,000 and preferably at least 50,000.

The thermoplastic acrylic polymers containing functional groups of the instant invention differ from thermosettable acrylic polymers in that these thermoplastic polymers are formed and applied as primers under conditions such that these functional groups do not react between themselves to effect a cross-linkage between the polymer chains. Thus, the primer layer contains thermoplastic acrylic polymers containing functional groups.

The thermoplastic acrylic polymers containing functional groups are in general applied as primers from a primer composition containing said thermoplastic acrylic polymers and a volatile solvent, either organic or inorganic in nature, which is generally substantially inert, i.e., will not greatly affect the polycarbonate part to be treated, but which is capable of dissolving the thermoplastic acrylic polymers. Generally, the concentrations of the thermoplastic acrylic polymer in the priming composition ranges from about 0.5 to about 25 percent by weight, preferably from about 1 to about 15 percent. Examples of suitable solvents include ethylene glycol diacetate, butoxyethanol, methylene-dichloride, 1,2-dichloroethylene, chloroform, benzene, toluene and the like.

The primer compositions of the instant invention may also optionally contain various flatting agents, ultraviolet light absorbent agents, surface active agents and thixotropic agents. All of these additives and the use thereof are well known in the art and do not require extensive discussions. Therefore, only a limited number will be referred to, it being understood that any compounds possessing the ability to function in such a manner, i.e., as a flatting agent, surface active agent, and ultraviolet light adsorbent agents can be used.

The various surface-active agents, including anionic, cationic and nonionic surface-active agents are described in *Kirk-Othmer Encyclopedia of Chemical Technology,* Vol. 19, Interscience Publishers, New York, 1969, pp. 507–593, and *Encyclopedia of Polymer Science and Technology,* Vol. 13, Interscience Publishers, New York, 1960, pp. 477–496, both of which are references and incorporated herein.

Exemplary ultraviolet light absorbent compounds or stabilizers include those of the hydroxy benzophenone or benzotriazole series. Examples of these are: 2-hydroxy-4-n-octoxybenzophenone, substituted hydroxyphenylbenzotriazole, 2-(2'-hydroxy-5'-methylphenyl)-benzotriazole, and 2-hydroxy-4-methoxybenzophenone. Further examples of ultraviolet light absorbers which may be used in the practice of this invention may be found in U.S. Pat. No. 3,043,709. In general, the amount of the ultraviolet light absorber may vary from about 0.5 to about 15 percent by weight based upon the weight of the priming composition.

A uniform film of the primer composition is applied onto the polycarbonate surface by any of the known means, such as dipping, spraying, roll-coating and the like. After the formed polycarbonate part is coated with the primer composition, the inert volatile solvent may be removed by drying the coated article until the volatile solvent evaporates, leaving a primer layer or coating containing the thermoplastic acrylic polymer containing functional groups on the polycarbonate surface to which the primer composition was applied. The drying operation may be hastened by the use of drying apparatus such as, for example, a drying oven. Generally, the primer layer is a uniform film having a thickness varying between about 0.002 mil to about 1 mil, preferably between about 0.01 mil to about 0.5 mil.

After the polycarbonate article which is to be coated has been primed by the application thereon of the primer composition and the evaporation of the solvent component of the primer composition, the primed surface of the polycarbonate article is then coated with the organopolysiloxane coating. In the practice of this invention, an organopolysiloxane coating composition containing a further curable organopolysiloxane is applied onto the solid primer and is then cured to form a thermoset organopolysiloxane coating.

The further-curable organopolysiloxane used in the practice of the instant invention is the partial hydrolysis and condensation product of at least one compound represented by the general formula $$R^2{}_nSiZ_{(4-n)} \qquad IV.$$

wherein $R^2$ represents a monovalent hydrocarbon radical and a halogenated monovalent hydrocarbon radical, Z represents a hydrolyzable group and n may vary between 0 and 2. More specifically, Z is independently a member such as halogen, alkoxy, acyloxy and aryloxy. Preferably, $R^2$ represents an alkyl radical containing from 1 to about 8 carbon atoms such as methyl, ethyl, and propyl through octyl (both normal and isomeric), an alkenyl radical containing from 2 to about 8 carbon atoms, such as vinyl and the normal and isomeric forms of propenyl through octenyl, and the phenyl radical; Z preferably represents an alkoxy radical containing from 1 to about 8 carbon atoms such as methoxy, ethoxy, propoxy, heptoxy, octoxy and the like, an acyloxy radical containing from 2 to about 9 carbon atoms such as acetoxy, propionoxy, butyroxy, pentanoxy, hexanoxy, and the like, and a phenoxy radical; and n varies from 0 to 2.

Preferred compounds of formula IV. are silanes of the formula $$R^3{}_aSi(OR^4)_{4-a} \qquad V.$$

and silanes of the formula $$R^5{}_bSi(OCOR^6)_{4-b} \qquad VI.$$

wherein $R^3$ and $R^5$ represent a monovalent hydrocarbon radical and a halogenated monovalent hydrocarbon radical, preferably an alkyl radical containing from 1 to about 8 carbon atoms, an alkenyl radical containing from 2 to about 8 carbon atoms, and the phenyl radical; $R^4$ and $R^6$ represent monovalent hydrocarbon radicals and halogenated monovalent radicals such as alkyl radicals and phenyl radicals, but are preferably alkyl radicals of 1 to 8 carbon atoms a is 0 or 1; and b varies from 0 to 2.

Upon hydrolysis, the compounds of formula IV, and more specifically those of formulas V and VI, are converted to the corresponding silanols. Upon generation of the silanol, there is condensation of the hydroxyl substituents to form —Si—O—Si— bonding. The condensation is not complete, but rather the organopolysiloxane retains a quantity of silicon-bonded hydroxyl group. This partial condensate can be characterized as a further-curable, i.e., further condensable, siloxanol polymer. During curing of the further-curable organopolysiloxane which has been deposited on the primed polycarbonate substrate, these residual hydroxyls condensate to give a silsesquixoane, $R^7SiO_{3/2}$, wherein $R^7$ represents $R^2$, $R^3$ or $R^5$ above.

The further-curable organopolysiloxane may be formulated into the top-coat composition as a solution of the further-condensable siloxanol polymer in water and alcohol by-product as a concentrated solution of further-condensable siloxanol in water and alcohol by-product formed by evaporating off a substantial quantity of the alcohol by-product and water, or it may be formulated onto the top-coat compositon as a solid partially pre-cured product by evaporating off a substantial amount of alcohol by-product and water and then partially precuring and solidifying the concentrated product.

Examples of good silicone top coats are the foregoing alkoxy and aryloxy functional silanes represented by formula V. and acyloxy functional silanes represented by formula VI. Such alkoxy functional, aryloxy functional, and acyloxy functional silanes are well known materials to silicone manufacturers and are easily obtainable.

With respect to the acyloxy functional silanes, these materials are generally applied without any solvent since it has been found that the use of solvents in the application of such top coats at times seriously degrades the applied silicone top coat. Preferably, the silanes of Formula VI, that is the acyloxy functional silanes, are applied at 100% solids or from 20 to 100% solids, in the case of the acyloxy silanes where the solids are less than 100% the silane is simply the water hydrolysis and partial condensation product of the foregoing acyloxy functional silanes of Formula VI. The alkoxy and acyloxy functional silanes of Formula V are generally applied from a top-coat composition containing solvents in a solids concentration of from about 20 to 95% by weight. Examples of solvents which may be used in the formulation of the top-coat composition include methanol, ethanol, butanol, ethyl acetate, benzene, toluene, xylene, ethylene glycol and the like. However, the alkoxy and aryloxy functional silanes may also, similarly to the acyloxy functional silanes, be applied from a top-coat composition which contains no solvents other than the alcohol by-product and water used to form the partial hydrolysis and condensation products of these silanes.

With respect to the foregoing aryloxy functional, alkoxy functional and acyloxy functional silanes mentioned above, such materials are well known in the art as, for instance, in U.S. Pat. Nos. 3,888,815 and 3,701,753, both of which are incorporated herein by reference.

One particular class of further-curable organopolysiloxanes which are employed in the top-coat compositions of the present invention are the partial hydrolysis and condensation products of alkoxy functional silanes, preferably alkyltrialkoxysilanes, preferably those alkyltrialkoxysilanes wherein the alkyl group contains from 1 to about 8 carbon atoms, and aryltrialkoxysilanes, preferably phenyltrialkoxysilanes, or mixtures thereof, wherein the alkoxy group contains from 1 to about 8 carbon atoms, such as, for example, methoxy, ethoxy, isopropoxy, butoxy, pentoxy, hexoxy, octoxy, and the like. The further-curable organopolysiloxanes are generally prepared by a process wherein the alkyltrialkoxysilane, aryltrialkoxysilane, or a mixture of alkyltrialkoxysilane and aryltrialkoxysilane is heated in the presence of water, wherein the molar ratio of water to total silane is at least about 1.5:1 and in the presence of an effective amount of a hydrolysis catalyst, such as a mineral acid, for exampel, HCl, for about 1 to about 10 hours at a temperature between ambient and reflux to produce a siloxane partial condensation product; the partial condensation product is then concentrated by heating to remove 50 to about 90 mole percent alkanol by-product and some water, and thereafter, the concentrated partial condensation product is precured by heating at a temperature below the gel point thereof and generally in the range of about 70° to 300° C. to produce the solvent-soluble, further curable organopolysiloxane. This precured solvent-soluble, further-curable organopolysiloxane is then dissolved in a suitable solvent to form the top-coat composition and the primed polycarbonate substrate is then coated with this top coat composition. The solvent is then evaporated and the residual further-curable organopolysiloxane is cured to a thermoset state to provide a uniformly and tenaciously adhered top coat on the primed polycarbonate substrate. The curing is effected at elevated temperatures in the range of about 50° to 135° C. for times between about 1 hour to about 72 hours, depending on the temperature at which the cure is effected. The silicone top coat generally should be cured preferably at an elevated temperature to effect the proper cure, but the temperature should be below the glass transition temperature of the polycarbonate. Of course, if the glass transition temperature of the polycarbonate is exceeded, then the polycarbonate part may become deformed and lose its utility.

One particular further-curable organopolysiloxane that can be employed in the top coat composition of the instant invention is the partial hydrolysis and condensation product of methyltriethoxysilane. This further-curable organopolysiloxane is prepared by hydrolyzing methyltriethoxysilane with water in the presence of an effective amount of a hydrolysis catalyst, such as HCl, for about 1 to 10 hours at a temperature generally between 40° C. and reflux temperature, to produce a partial condensation product. This partial condensation product is then concentrated by heating to remove some of the alkanol by-product and water. This concentrated product is then partially pre-cured at a temperature of about 70° to about 300° C. and below the gel point thereof and then solidified to provide a solid, solvent-soluble, further curable organopolysiloxane. The solid, solvent-soluble, further-curable organopolysiloxane is then dissolved to a desired concentration in a suitable solvent to form the top coat composition. The top coat composition is then applied to the primed polycarbonate substrate, after which the solvent is evaporated and the further-curable organopolysiloxane finally cured to provide a hard, abrasion and chemical solvent resistant, thermoset organopolysiloxane top coat in the polycarbonate substrate.

Another further-curable organopolysiloxane which may be employed in the practice of the present invention is the partial hydrolysis and condensation product of a mixture of methyltriethoxysilane and phenyltriethoxysilane. This organopolysiloxane is prepared by hydrolyzing a mixture of methyltriethoxysilane and phenyltriethoxysilane with water in the presence of a hydrolysis catalyst such as HCl to produce a partial condensation product. This partial condensation product is then concentrated by heating to remove a substantial amount of the alkanol by-product and some water. This concentrated product is then partially pre-cured by heating and then solidified to provide a solid, solvent-soluble, further-curable organopolysiloxane. The solid, solvent-curable, further-curable organopolysiloxane is then dissolved to a desired concentration in a suitable solvent to form the top-coat composition containing a further-curable organopolysiloxane. The top-coat composition is then applied to the primed polycarbonate substrate, after which the solvent is evaporated and the further-curable organopolysiloxane is finally cured to provide a tenaciously and durably adhered, abrasion and chemical resistant thermoset organopolysiloxane top coat on the polycarbonate substrate.

These are not the only silicones that may be utilized in the top-coats of the instant invention. Less preferred silicones which can be utilized to form the top coats of the present invention are, for instance, silicone resins composed of trifunctional and difunctional units, silicone resins composed of trifunctional units, difunctional units and tetrafunctional units when the organo substituent groups in the trifunctional units may be selected from hydrocarbon radicals of 1 to about 8 carbon atoms and are preferably methyl, phenyl and vinyl; and wherein the organo substituent groups is the difunctional siloxy units may be selected from hydrocarbon units of from 1 to about 8 carbon atoms, preferably alkyl radicals, vinyl radicals and phenyl radicals. Such silicone resins usually have an organic to silicon atom ratio of 1:1 to 1.9:1; may have a silanol content that varies anywhere from 4 to 10 weight percent and optionally may have an alkoxy content that varies from 2 to 4%. The preparations of such silicone resins which may be utilized as top-coats in the invention of the instant case are, for instance, to be found in U.S. Pat. Nos. 3,375,223, 3,435,001, 3,450,672, 3,790,527, 3,832,319, 3,865,766, 3,887,514 and 3,925,276.

These silicones may also contain various fillers such as, for example, glass fibers, talc and silica, preferably colloidal silica.

The top-coat compositions containing the aforedescribed silicones are simply brushed, dipped, sprayed or flowed on top of the primer layer that is applied to the polycarbonate substrate. The solvent, or alcohol by-product and water, present in the top-coat composition is evaporated and the residual further-curable organopolysiloxane is cured to form a thermoset organopolysiloxane top coat. Preferably, the further-curable organopolysiloxane is cured at elevated temperatures. Although certain catalysts may be utilized to accelerate the cure of the further-curable organopolysiloxane, such catalysts are not necessary if the further-curable organopolysiloxane is cured by itself at the elevated temperature for a sufficient length of time.

Another embodiment of the present invention is a process of producing a durably adherent, mar, and chemical resistant silicone coating on a polycarbonate article. The process comprising the steps of: (i) applying onto the polycarbonate substrate a primer composition containing a thermoplastic acrylic polymer dissolved in a suitable solvent; (ii) evaporating of the solvent to leave a solid thermoplastic acrylic polymer containing primer layer on the polycarbonate substrate; (iii) applying a top-coat composition containing a further-curable organopolysiloxane onto the primed polycarbonate substrate; (iv) evaporating off the volatile solvents present in the top coat composition to form a residue of further-curable organopolysiloxane on the primed polycarbonate substrate; and (v) curing the further-curable organopolysiloxane to form a top coat containing a thermoset organopolysiloxane.

PREFERRED EMBODIMENT OF THE INVENTION

In order that those skilled in the art may better understand how the present invention may be practiced, the following examples are given by way of illustration and not by way of limitation.

EXAMPLE 1

An aromatic polycarbonate is prepared by reacting 2,2-bis(4-hydroxyphenyl) propane and phosgene in the presence of an acid acceptor and a molecular weight regulator and having an intrinsic viscosity of 0.57. The product is then fed to an extruder, which extruder is operated at about 265° C. and the extrudate is comminuted into pellets.

The pellets are then injection molded at about 315° C. into test panels of about 4 in. by 4 in. by about ⅛ in. thick. The test panels are subjected to an abrasion test. The abrasion test is one wherein test panels having a ¼ inch diameter hole cut in the center are subjected to a Taber Abraser. The Taber Abraser is equipped with CS-10F wheels which are resurfaced every 200 cycles by abrading for 25 cycles on a S-11 refacing disc. The weights used in combination with the CS-10F wheels are 500 gm. weights. Initial measurements of % Haze are made at four places around the future wear track of the sample using a Gardner Hazemeter. The sample is abraded for 300 cycles, cleaned with isopropanol, and the % Haze is remeasured at the same four places. The four differences in % Haze are calculated and averaged to give the 66% Haze. The results are set forth in Table II.

EXAMPLE 2

A top-coat composition is prepared by adding to 100 parts by weight of a commercially available further-curable organopolysiloxane 2 parts by weight of a commercially available curing catalyst. This further-curable organopolysiloxane is available from Resart-Ihm A.G., Mainze, Federal Republic of Germany, as their Resarix SFPC® and is a solution containing about 32 weight percent of the partial hydrolysis and condensation product of methyl triethoxysilane dissolved and a solvent system consisting of ethanol-tetrahydrofuran-n-butanol-ethoxyethanol. The catalyst consists of a solution containing 2 weight percent of tetraethylammonium hydroxide and a methanol solvent.

EXAMPLE 3

Primer compositions are formulated by dissolving in a solvent system containing 20 parts ethyleneglycol diacetate and 80 parts butoxyethanol a desired amount of a thermoplastic acrylic polymer containing functional groups formed by the copolymerization of a methacrylate monomer and a functional methacrylate monomer. This primer composition is flow coated on polycarbonate test panels prepared substantially in accordance with Example 1. Excess primer composition is permitted to drain off and the test panels are dried for 15 minutes at 125° C. to evaporate the solvent and produce a solid primer layer. These primed panels are then flow coated with the further-curable organopolysiloxane top coat composition produced substantially in accordance with Example 1. Excess top coat composition is permitted to drain off and the test panels are air dried for 30 minutes and are thereafter subjected to 1 hour of heating at 125° C. to cure the further-curable organopolysiloxane. These primed, top coated test panels are then subjected to the above described abrasion test and to an adhesion test which consists of using a multiple blade tool to cut parallel grooves about 1 mm apart through the coating into the substrate, rotating the sample 90° and repeating the cutting process thereby forming a grid pattern of 1 mm squares cut into the coating, and applying an adhesive tape over the cross-hatched area and quickly pulling said tape off. (A sample fails the adhesion test if any of the squares in the grid are pulled off.) The results of the adhesion test and abrasion test, as well as the concentration of the thermoplastic acrylic polymer containing functional groups in the primer composition, the thickness of the primer layer and the composition of the monomer mixtures used in formulating the thermoplastic acrylic polymer containing functional groups are set forth in Table II.

TABLE II

| Composition, in parts by weight, of monomer mixture | %, by weight, of solids in primer composition | Primer thickness (in mils) | Adhesion | Δ % Haze 300 cycles |
|---|---|---|---|---|
| Unprimed and uncoated test panel of Example 1 | — | — | — | 34 |
| 97 parts of methylmethacrylate 3 parts hydroxyethyl methacrylate | 5 | 0.02 | Pass | 5.3 |
| 98 parts ethyl methacrylate 2 parts glycidyl methacrylate | 2 | 0.02 | Pass | 5.2 |
| 49 parts methyl methacrylate 49 parts n-butyl methacrylate 2 parts hydroxyethyl methacrylate | 10 | 0.05 | Pass | 4.9 |

TABLE II-continued

| Composition, in parts by weight, of monomer mixture | %, by weight, of solids in primer composition | Primer thickness (in mils) | Adhesion | Δ % Haze 300 cycles |
| --- | --- | --- | --- | --- |
| 97 parts methyl methacrylate 3 parts hydroxyethyl methacrylate | 15 | 0.27 | Pass | 3.1 |
| 98 parts ethyl methacrylate 2 parts γ-methacryloxypropyltrimethoxysilane | 20 | 0.31 | Pass | 5.2 |

EXAMPLE 4

This example is designed to illustrate the criticality of the particular combination of the thermoplastic acrylic polymer primer layer containing functional groups and organopolysiloxane top coat in providing a durable and tenaciously adhered coating effective to produce an abrasion resistant polycarbonate article. Unprimed polycarbonate panels are prepared substantially in accordance with Example 1 and are flow-coated with the Resarix SF/PC® organopolysiloxane top coat compositon prepared substantially in accordance with Example 2. Excess top coat composition is permitted to drain off and the coated unprimed test panels are air dried for 30 minutes to evaporate the sclvent, followed by a one-hour bake at 250° F. to cure the further-curable organopolysiloxane. These unprimed coated test panels are subjected to the aforedescribed adhesion and abrasion tests and the results are set forth in Table wII.

TABLE III

| Sample | Adhesion | Δ % Haze, 300 cycles |
| --- | --- | --- |
| Example 4 | Failed | 10.3 |

As can be seen from Tables II and III, the adhesion of the organopolysiloxane top coat to the unprimed polycarbonate panels is markedly inferior. As a matter of fact, it is unsatisfactory, as compared to the adhesion of the organopolysiloxane top coat to the polycarbonate panels primed in accordance with the present invention.

EXAMPLE 5

This example is likewise designed to illustrate the criticality of the particular combination of the thermoplastic acrylic polymer primer layer containing functional groups and organopolysiloxane top coat of the instant invention in providing a durable and tenaciously adhered coating effective to produce an abrasion resistant polycarbonate article. EV-6174, a commercially available thermosettable acrylic (32% solids in butanol) available from Bee Chemical Company, is diluted with n-butanol to various solids concentrations. Into these solutions are dipped polycarbonate test panels prepared substantially in accordance with Example 1. The polycarbonate panels are then removed from the priming solutions and are allowed to remain in the open air for about 30 minutes, during which time the solvent from the priming solutions evaporates and deposits a thin priming film on the polycarbonate surface. The primed test panels are then flow coated with an organopolysiloxane top coat composition prepared substantially in accordance with Example 2. Excess top coat composition is permitted to drain off and the test panels are air dried for 30 minutes and thereafter subjected to 1 hour of heating at 125° C. These primed and top coated test panels are subjected to the aforedescribed adhesion test and to the abrasion test. The results of these tests, as well as the concentration of the thermosettable acrylic in the primer solution and the thickness of the primer layer are set forth in Table IV.

TABLE IV

| % Solids (thermosettable) acrylic polymer) in n-butanol solution | Primer thickness (mils) | Adhesion | Δ % Haze |
| --- | --- | --- | --- |
| 2 | 0.01 | Pass | 7.1 |
| 20 | 0.36 | Marginal* | 7.5 |

*The results of the adhesion test were uneven. That is to say, some samples failed the adhesion test, while other samples passed the adhesion test.

A comparison of Tables II and IV shows that with a thermosettable acrylic primer the abrasion resistance of the top coat, as well as the adhesion of the top coat, deteriorates as the thickness of the primer layer increases. This is not the case with the thermoplastic acrylic primers of the present invention, i.e., the adhesion and abrasion resistance of the top coat do not deteriorate as the thickness of the primer layer increases.

Thus, a particular advantage of the instant thermoplastic acrylic primers is that the abrasion resistance and adhesion of the silicone top coat is generally not a function of primer layer thickness. It is well known to those skilled in the art that wedging occurs during the coating of large polycarbonate sheets. Thus, it is a great advantage if properties such as abrasion resistance and adhesion are generally not dependent upon primer coating thickness.

A further advantage of having a thick primer coating is that ultraviolet light and other stabilizers can effectively be incorporated in the coating. Polycarbonate generally undergoes photodegradation and turns yellow during prolonged weathering. However, if the surface of polycarbonate can be protected from ultraviolet light, it can be stabilized against photodegradation. Incorporation of ultraviolet light-absorbers in a coating on polycarbonate is therefore highly desirable since these materials will screen ultraviolet light from reaching the surface of the polycarbonate. For practical purposes, however, a coating must generally be about 0.2–0.3 mils thick and contain about 10% of an ultraviolet light-absorber before more than 90% of the incident ultraviolet light can be screened from the surface of the polycarbonate. Thinner primer coatings generally require much more ultraviolet light-absorbers to effectively screen more than 90% of incident ultraviolet light. Due to the fact that the primer layers of the instant invention can be relatively thick, ultraviolet light-absorbers can therefore be effectively incorporated in the thermoplastic acrylic primers of the instant invention.

The foregoing disclosure of this invention is not to be considered as limiting, since many variations may be made by those skilled in the art without departing from the scope or spirit of the foregoing description. For example, although the above examples are limited to only a few of the very many thermoplastic acrylic polymers containing functional groups which can be employed in the present invention, it should be understood that the present invention includes a much broader class of such polymers as shown by formula III and the description preceding these examples.

What we claim as new and desire to secure by Letters Patent of the United States is:

1. A process for providing a polycarbonate substrate with an abrasion and chemical solvent resistant thermoset organopolysiloxane coating consisting essentially of: (i) priming at least one surface of said substrate by applying onto said surface a primer composition consisting essentially of a thermoplastic acrylic polymer containing functional groups, said functional groups being selected from the group consisting of hydroxyl, carboxyl, amine, epoxide, amide, —SH, —SO$_3$H, —COOR, —Si(OR$^1$)$_3$, and mixtures thereof wherein R and R$^1$ are alkyl radicals containing from 1 to about 20 carbon atoms, and a solvent for said acrylic polymer; (ii) evaporating off the solvent from said primer composition thereby forming a solid primer layer consisting essentially of a thermoplastic acrylic polymer containing functional groups; (iii) applying onto the primer layer a top coat composition consisting of a solvent-soluble further-curable organopolysiloxane and a solvent therefor; (iv) evaporating off a substantial amount of the solvent in the top-coat composition; and (v) curing said further-curable organopolysiloxane thereby forming a hard, abrasion and chemical solvent resistant top-coat consisting of a thermoset organopolysiloxane which is tenaciously and durably adhered to the polycarbonate substrate.

2. The process of claim 1 wherein said thermoplastic acrylic polymer containing functional groups is the polymerization product of at least one monomer represented by the general formula CH$_2$=CY—COOR$^2$ and at least one monomer represented by the general formula CH$_2$=CY$^1$—COOR$^3$X wherein Y and Y$^1$ are hydrogen or a methyl radical; R$^2$ and R$^3$ are alkyl groups containing from 1 to about 20 carbon atoms; and X is a hydroxyl, carboxyl, amine, epoxide, amide, COOR and Si(OR$^1$)$_3$ groups wherein R and R$^1$ are alkyl groups containing from 1 to about 20 carbon atoms.

3. The process of claim 1 wherein said further-curable organopolysiloxane is the partial hydrolysis and condensation product of at least one compound represented by the general formula R$_n^4$SiZ$_{(4-n)}$ wherein R$^4$ represents a monovalent hydrocarbon radical, Z represents a hydrolyzable group, and n may vary between 0 and 2.

4. The process of claim 3 wherein Z represents an —OR$^5$ group wherein R$^5$ is a monovalent hydrocarbon radical and wherein n is 0 or 1.

5. The process of claim 3 wherein Z represents an —OCOR$^6$ group wherein R$^6$ is a monovalent hydrocarbon radical.

6. The process of claim 1 wherein said primer composition contains at least one ultraviolet light absorbing compound.

* * * * *